United States Patent [19]

Funawatari et al.

[11] Patent Number: 5,691,868
[45] Date of Patent: Nov. 25, 1997

[54] DISK CARTRIDGE WITH SHUTTER AND SLIDER, AND METHOD OF CONNECTING THEM

[75] Inventors: Takatsugu Funawatari; Hiroyuki Ishikawa; Hiroyuki Abe, all of Miyagi; Kazuo Niizaka, Saitama, all of Japan

[73] Assignee: Sony Corporation, Tokyo, Japan

[21] Appl. No.: 545,770

[22] PCT Filed: Mar. 24, 1995

[86] PCT No.: PCT/JP95/00544

§ 371 Date: Nov. 24, 1995

§ 102(e) Date: Nov. 24, 1995

[87] PCT Pub. No.: WO95/27980

PCT Pub. Date: Oct. 19, 1995

[30] Foreign Application Priority Data

Apr. 7, 1994 [JP] Japan .................................. 6-69182

[51] Int. Cl.⁶ .................................................. G11B 23/03
[52] U.S. Cl. .................................... 360/133; 369/291
[58] Field of Search .................... 360/93, 133; 369/291

[56] References Cited

U.S. PATENT DOCUMENTS

| | | | |
|---|---|---|---|
| 5,050,030 | 9/1991 | Nemoto et al. | 360/133 |
| 5,121,380 | 6/1992 | Fujita et al. | 360/133 X |
| 5,140,490 | 8/1992 | Fujita et al. | 369/291 X |
| 5,325,257 | 6/1994 | Akijama et al. | 360/133 |
| 5,408,458 | 4/1995 | Akiyama | 369/291 |

OTHER PUBLICATIONS

Japanese Patent Provisional Publication No. 3-30164.

Japanese Patent Provisional Publication No. 4-351773.

Japanese Patent Provisional Publication No. 5-234305.

Primary Examiner—John H. Wolff
Attorney, Agent, or Firm—Jay H. Maioli

[57] ABSTRACT

A disk cartridge has a shutter. The shutter is slidably connected to a shell body by a slider made of synthetic resin. The shutter has a plurality of pin-insertion holes on its mating surface. The slider has a plurality of connecting pins that are inserted into the pin-insertion holes of the shutter so that its mating surface mates with the mating surface of the shutter. The connecting pins are formed at distal ends thereof with heads having larger diameters than the pin insertion holes to support the shutter between the heads and the mating surface of the slider. The heads of the connecting pins are provided by plastic-deforming the distal ends of the connecting pins.

12 Claims, 16 Drawing Sheets

DISK CARTRIDGE WITH SHUTTER AND SLIDER, AND METHOD OF CONNECTING THEM

TECHNICAL FIELD

The present invention relates to a disk cartridge in which a shutter is slidably mounted on a shell body through a slider so as to open and close an aperture provided on the shell body for receiving a head or spindle, and particularly to a disk cartridge in which coupling of the shutter with the slider is carried out simply, easily, surely, and quickly without using tapping screws.

BACKGROUND ART

There is known a disk cartridge (for example, 3.5-inch MO disk cartridge) as shown in FIG. 25, in which a shutter 101 is slidably mounted on a shell body 103 through a slider 102 to open and close an aperture 104 provided on the shell body 103 for receiving a magnetic head.

The shutter 101 is formed of a generally U-shaped metal plate and with screw-insertion holes (not shown) at both ends of a surface mating with the slider 102.

The slider 102 is made of a synthetic resin and coupled with the shutter 101 by screws 105 and 106 inserted into the screw-insertion holes of the shutter 101.

The shell body 103 is composed of an upper half 111 and a lower half 112 and accommodates a disk-shaped recording medium 113 (hereinafter referred to as disk) interposed between these upper and lower halves 111 and 112.

The conventional disk cartridge as described above has the following problems because of the construction in which the shutter 101 is coupled with the slider 102 by using the screws 105 and 108.

(1) Using of the screws 105 and 108 causes an increase in the number of parts, leading to a higher manufacturing cost.

(2) Tightening of the screws 108 and 106 for coupling the shutter 101 with the slider 102 causes a reduction of assembling efficiency. This is because the tightening must be generally performed by using a parts feeder which is used for bringing the screws into line and transporting them to a tightening device. However, the screws tend to stick on the parts feeder during the transportation.

The present invention contemplates to solve the conventional problems as mentioned above.

DISCLOSURE OF THE INVENTION

The present invention aims to provide a disk cartridge comprising: a shell body accommodating a disk rotatably disposed therein;

a slider disposed slidably along one end of the shell body and made of synthetic resin; and a shutter secured to the slider for opening and closing a head or spindle insertion aperture formed on the shell body in association with sliding movement of the slider;

the shutter having a plurality of pin-insertion holes formed on its mating surface, the slider having a plurality of connecting pins formed on its mating surface which mates with the mating surface of the shutter, the connecting pins being inserted into the pin-insertion holes and plastic-deformed at distal ends thereof to be provided at the distal ends with heads having greater diameters than the pin-insertion holes so that the shutter is interposed between the heads and the mating surface of the slider whereby the shutter and the slider are coupled together.

Therefore, the disk cartridge according to the present invention can dispense with the screws for connecting the shutter and the slider which are used in the conventional disk cartridge. This leads to a reduction in the number of parts.

BEST MODE FOR EMBODYING THE INVENTION

The present invention will be explained with reference to FIGS. 1–24.

Figure 1:
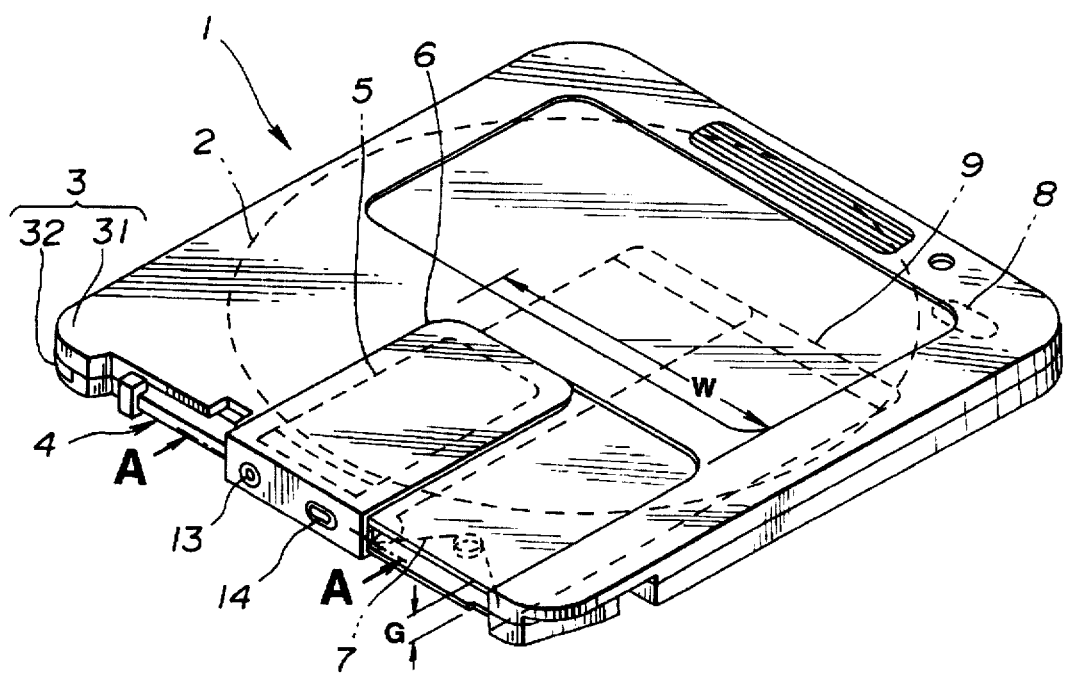
FIG. 1 is a perspective view of a disk cartridge of a first embodiment of the present invention.

FIG. 1 shows a perspective view of a disk cartridge 1 of a first embodiment according to the present invention.

The disk cartridge 1 includes a disk 2 acting as a recording medium, a shell body (casing) 3 receiving the disk 2, a shutter 6 made of metal and slidably mounted on the shell body 3 through a slider 4 made of synthetic resin to open and close a head or spindle insertion aperture 5 formed on the shell body 3, a shutter spring 7 forcing the shutter 6 to be kept in its closed position, a write protector 8, and a shutter guide 9.

Figure 2:
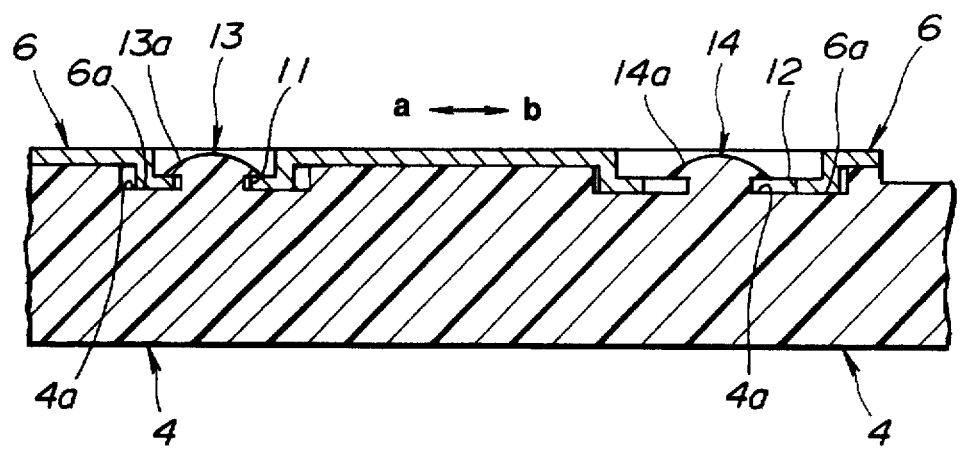
FIG. 2 is a sectional view taken along line A—A in FIG. 1.

As illustrated in FIG. 2, the shutter 6 has a first pin-insertion hole 11 at one end of its mating surface 6a, in a shutter sliding direction (direction as indicated by double-headed arrow a–b), and a second pin-insertion hole 12 at the other end thereof.

The slider 4 has, at its mating surface 4a mating with the mating surface 6a of the shutter 6, a first connecting pin 13 inserted into the first pin-insertion hole 11, and a second connecting pin 14 inserted into the second pin-insertion hole 12.

The first connecting pin 13 has at its distal end a greater-diameter head 13a which cooperates with the mating surface 4a mating with the shutter 6 to support the shutter 6 therebetween.

The second connecting pin 14 has at its distal end a greater-diameter head 14a which cooperates with the mating surface 4a mating with the shutter 6 to support the shutter 6 therebetween.

Figure 3:
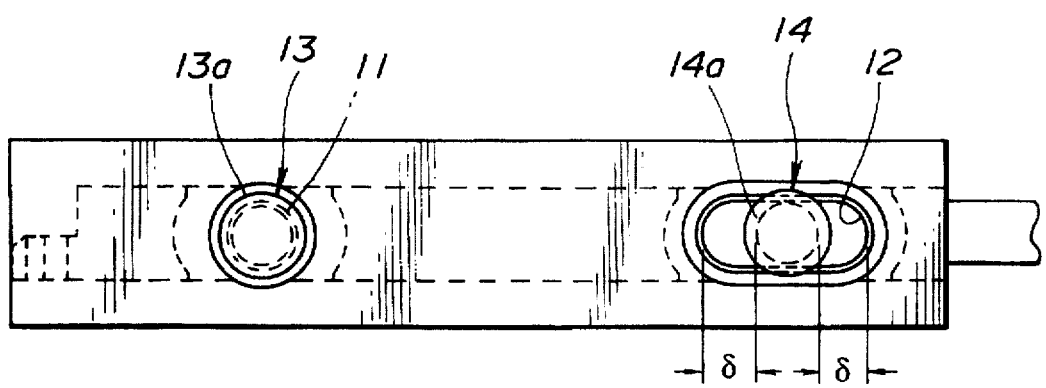
FIG. 3 is a plan view of an essential portion of the disk cartridge.

As illustrated in FIG. 3, the first connecting pin 13 and the second connecting pin 14 are of a cylindrical shape.

The first pin-insertion hole 11 is of a circular shape having substantially same diameter as the first connecting pin 13.

The first connecting pin 13 is received in the first pin-insertion hole 11 in a tight-fitting manner.

The first pin-insertion hole 11 acts as a reference hole for relative positioning of the shutter 6 and the slider 4 upon coupling the shutter 6 with the slider 4, and the first connecting pin 13 acts as a reference pin therefor.

The second pin-insertion hole 12 is of a generally circular shape elongated in the shutter sliding direction.

The second connecting pin 14 is received in the second pin-insertion hole 12 with a clearance δ in the shutter sliding direction.

The clearance δ is provided for compensating dimensional errors occurring inevitably in the formation of the first and second pin-insertion holes 11 and 12 and the first and second connecting pins 13 and 14, upon coupling the shutter 6 on the slider 4, so that the second connecting pin 14 is reliably received in the second pin-insertion hole 12.

Next, the disk cartridge of the first embodiment will now be explained in detail.

Figure 4:
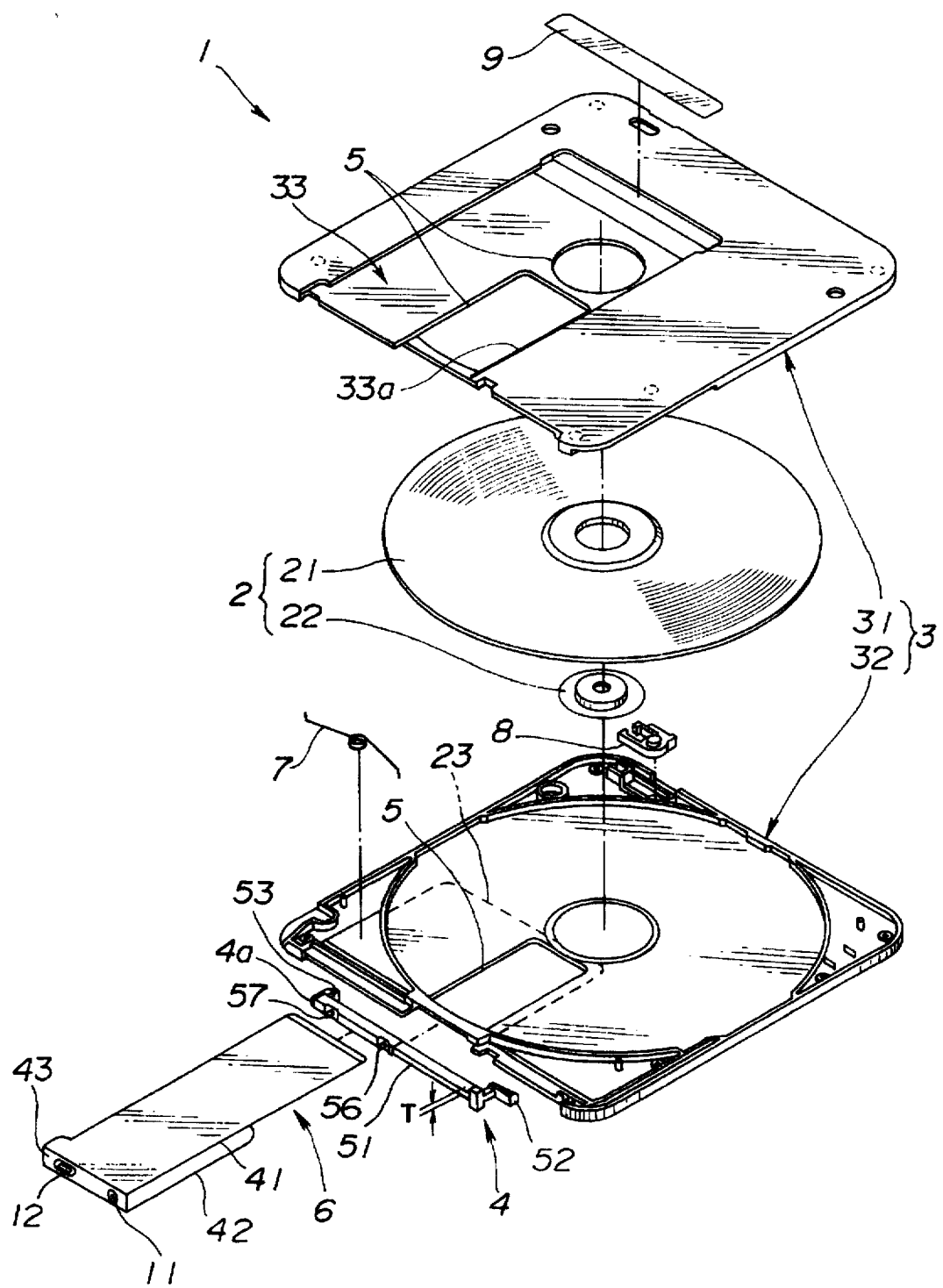
FIG. 4 is a perspective view of the disk cartridge before assembled.

FIG. 4 is a perspective view of the disk cartridge 1 before assembly.

The disk 2 includes a disk-shaped recording medium 21, and a hub 22 made of metal and mounted to a central portion of the recording medium 21.

The shell body 3 includes an upper half 31 and a lower half 32.

Each of the upper and lower halves 31 and 32 is formed on its outer surface with a recessed portion for mounting the shutter, which forms a shutter sliding area 33 having the head or spindle insertion aperture 5 on one side 33a thereof.

The shutter 6 is mounted in such a way as to pinch the upper and lower halves 31 and 32 at the shutter sliding areas 33 and 23.

The shutter 6 has a pair of aperture-opening/closing sections 41 and 42 overlapped in the shutter sliding areas 33 and 23 of the upper and lower halves 31 and 32, and a connecting section 43 connecting one end of the aperture opening/closing section 41 with one end of the aperture opening/closing section 42.

Figure 5:
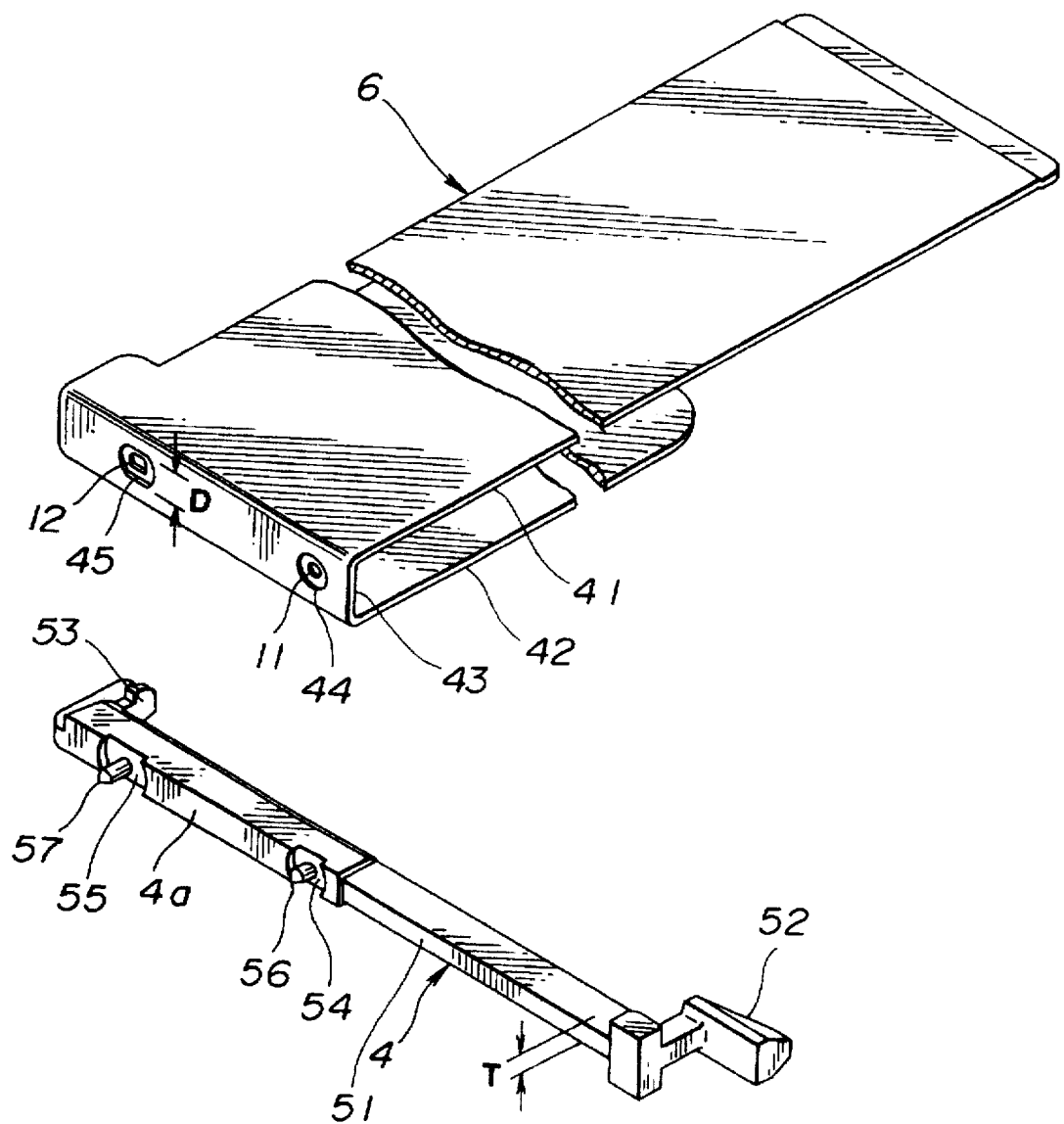
FIG. 5 is a perspective view showing a shutter and a slider.

As illustrated in enlarged scale in FIG. 5, the connecting section 43 is formed at one end portion thereof in the shutter sliding direction (longitudinal direction) with a first recessed portion 44, and at the other end portion thereof in the same direction with a second recessed portion 45.

The first recessed portion 44 has the first pin-insertion hole 11 on its bottom and the second recessed portion 45 has the second pin-insertion hole 12 on its bottom.

The first and second recessed portions 44 and 45 are formed upon shaping the opposite end portions of the connecting section 43 by drawing.

The first recessed portion 44 is of a cylindrical shape.

The first pin-insertion hole 11 is provided at the center of the bottom of the first recessed portion 44 in the form of a circle having a smaller diameter than a diameter of the first recessed portion 44.

The second recessed portion 45 is of an ellipsoid shape elongated in the shutter sliding direction.

The second pin-insertion hole 12 is provided at the center of the bottom of the second recessed portion 45 in the form of an ellipsoid elongated in the shutter sliding direction, which shape is similar to the shape of the second recessed portion 45.

The slider 4 is now explained in detail.

The slider 4 has an elongated rectangular parallelepiped-shaped body portion 51, a first guide portion 52 provided at one end thereof in a longitudinal direction of the body portion 51 (the shutter sliding direction), and a second guide portion 53 at the other end thereof in the same direction.

The body portion 51 has a thickness T which is smaller than a clearance G (see FIG. 1) between the upper and lower halves 31 and 32 of the shell body 3, and a length substantially same as a width W of the shutter sliding area 5 of the shell body 3.

The mating surface 4a of the body portion 51 which mates with the shutter 6 has at one end portion thereof a first concaved portion 54 engaged with the first recessed portion 44 of the shutter 6, and at the other end portion thereof a second concaved portion 55 engaged with the second recessed portion 45 of the shutter 6.

A first straight pin 56 extends uprightly from the center of a bottom of the first concaved portion 54, acting as the first connecting pin 13 after the head 13a is formed thereon.

A second straight pin 57 extends uprightly from the center of a bottom of the second concaved portion 55, acting as the second connecting pin 14 after the head 14a is formed thereon.

The first straight pin 56 and the second straight pin 57 are shaped into a cylindrical column.

In addition, the first straight pin 56 and the second straight pin 57 have distal ends of a conical shape.

The first straight pin 56 is so designed as to have a predetermined height (length).

The second straight pin 57 is so designed as to be slightly higher (longer) than the first straight pin 56.

Figure 6:
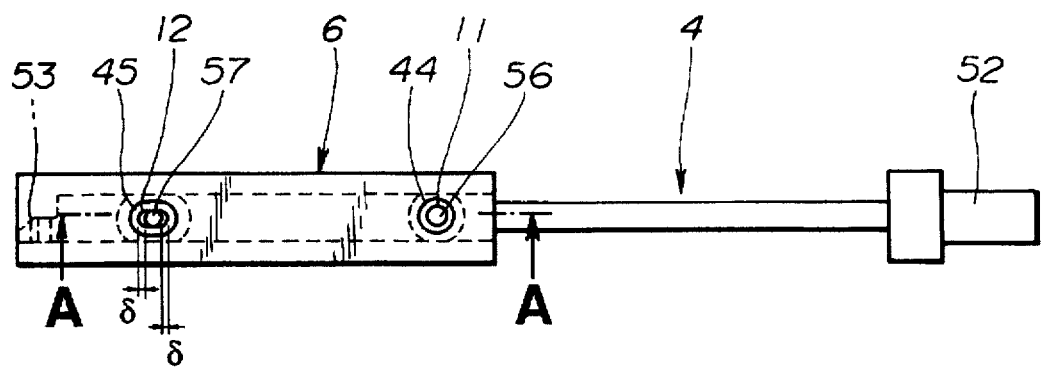
FIG. 6 is a plan view showing a condition in which a pin is inserted into a pin-insertion hole.

The first straight pin 56 and the second straight pin 57 are inserted into the first pin-insertion hole 11 and the second pin-insertion hole 12, respectively. As illustrated in FIG. 6, the first straight pin 56 is engaged with the first pin-insertion hole 11 in tight-fitting relation to an inner circumferential surface of the first pin-insertion hole 11.

On the other hand, the second straight pin 57 is engaged in a generally central portion of the second pin-insertion hole 12 with the predetermined clearance δ formed back and forth in the shutter sliding direction.

Owing to the fitting engagement of the first straight pin 56 with the first pin-insertion hole 11, the relative positioning of the shutter 6 and the slider 4 is determined. Simultaneously, the provision of the clearance δ between the second straight pin 57 and the second pin-insertion hole 12 serves for compensating dimensional errors occurring inevitably when the first and second straight pins 56 and 57 and the pin-insertion holes 11 and 12 are formed. Then, subsequent to inserting the first straight pin 56 and the second straight pin 57 into the first pin-insertion hole 11 and the second pin-insertion hole 12, respectively, as described above, the heads 13a and 14a are formed at the distal ends of the first and second straight pins 56 and 57, respectively.

Figure 7:
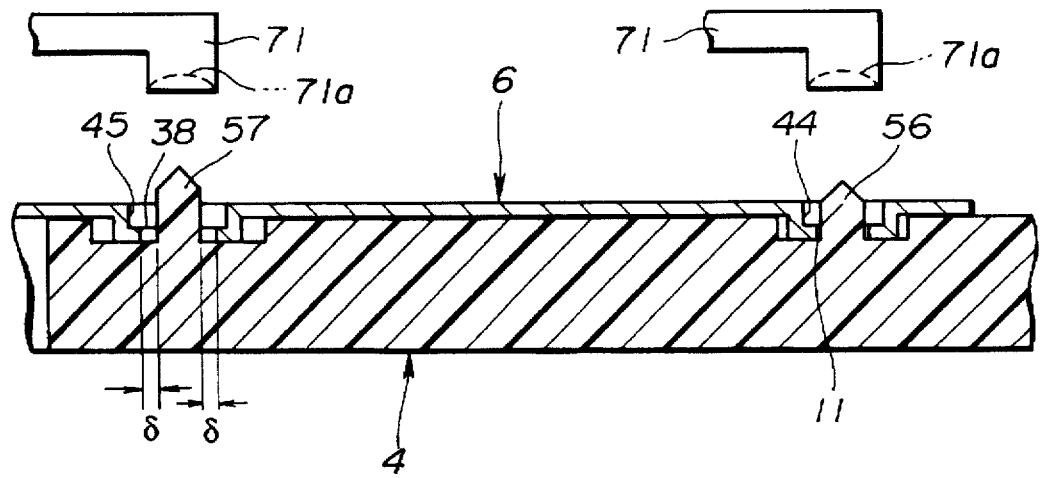
FIG. 7 is a sectional view showing the condition in which the pin is inserted into the pin-insertion hole.

The formation of the heads 13a and 14a is performed, as shown in FIG. 7, by using an ultrasonic welding machine in such a manner that horns 71 of the ultrasonic welding machine are contacted with the distal ends of the first and second straight pins 56 and 57 to apply vibrations thereto.

The horns 71 have on lower surfaces thereof arcuate head-forming faces 71a which are so designed as to have same configuration and size as the heads 13a and 14a.

The horn 71 moves downward until the arcuate head-forming face 71a contacts the distal end of the first straight pin 56 or second straight pin 57. When the horn 71 is caused to vibrate, first, the distal end of the first straight pin 56 or second straight pin 57 is heated at its portion contacting the horn and plastic-deformed to be shaped into a curved surface along the arcuate head-forming face 71a. As a result, the first straight pin 56 or second straight pin 57 is provided with the head 13a or 14a as shown in FIG. 2 at the distal end thereof, acting as the first connecting pin 13 with the head 13a or the second connecting pin 14 with the head 14a.

The head 13a or 14a is received in the first or second recessed portion 44 or 45 to prevent it from projecting from an outer surface of the connecting section 43 of the shutter 6.

Figure 8:
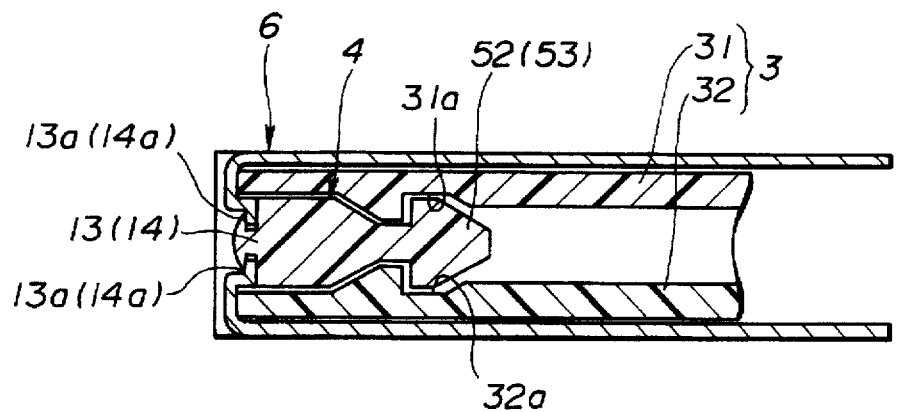
FIG. 8 is a sectional view showing a condition in which the shutter is mounted on a shell body.

As illustrated in FIG. 8, when coupled with the shutter 6 as explained above, the slider 4 is interposed between the upper and lower halves 31 and 32 so that the first and second guide portions 52 and 53 are engaged with guide grooves 31a and 32a which are formed on inner surfaces of the upper and lower halves 31 and 32, respectively. Thus, the shutter 6 is slidably mounted on the shell body 3.

The disk cartridge of the first embodiment has a construction as described above.

Accordingly, the slider 4 and the shutter 6 can be coupled with each other by means of the first and second connecting pins 13 and 14 formed integrally with the slider 4 made of synthetic resin, without using tapping screws.

In addition, there are provided the fitting engagement of the first connecting pin 13 with the first pin-insertion hole 11, and the loose engagement of the second connecting pin 14 with the second pin-insertion hole 12 with play therebetween.

Accordingly, the first pin-insertion hole 11 has a function as the reference hole for positioning and the first connecting pin 13 has a function as the reference pin for positioning.

Further, the coupling of the slider 4 and the shutter 6 is readily performed by providing the clearance δ between the inner circumferential surface of the second pin-insertion hole 12 and an outer circumferential surface of the second connecting pin 14 received therein for compensating dimensional errors occurring inevitably upon the formation of the first and second connecting pins 13 and 14 and the first and second pin-insertion holes 11 and 12.

Figure 9:
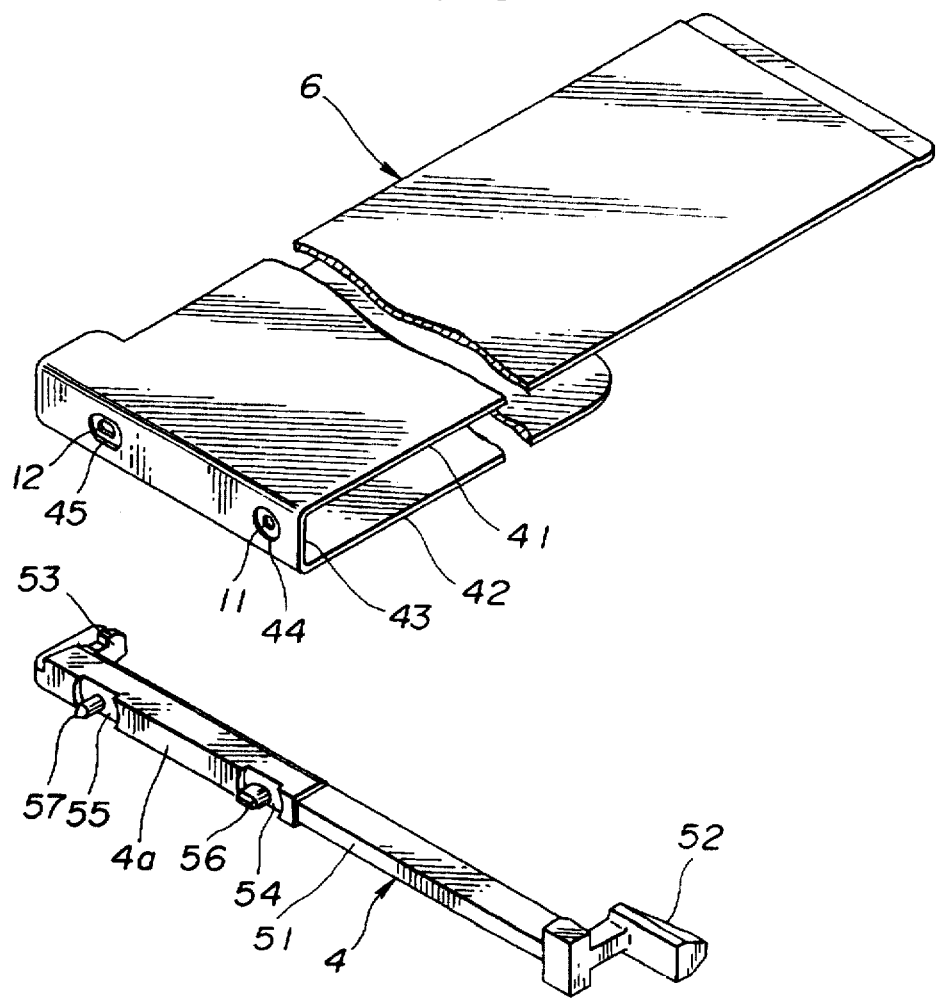
FIG. 9 is a perspective view showing a shutter and a slider of a second embodiment of the present invention.
Figure 10:
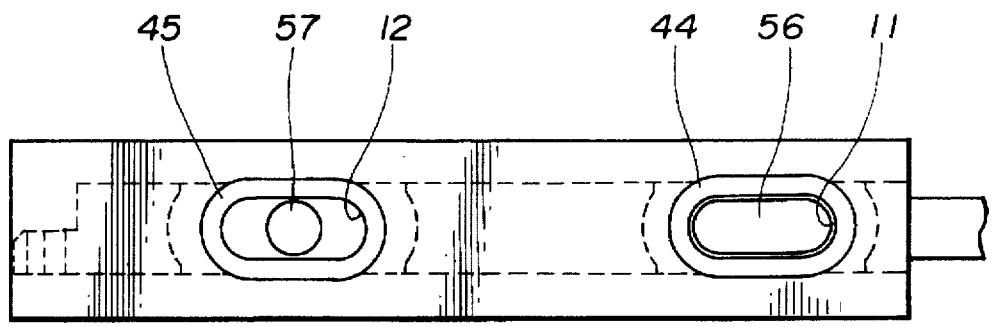
FIG. 10 is a plan view showing a condition in which a pin is inserted into a pin-insertion hole.

FIGS. 9 and 10 show a second embodiment of the present invention.

In this embodiment, the first pin-insertion hole 11 acting as the reference hole for positioning is of an elliptic shape elongated in the shutter sliding direction.

The first straight pin 56 engaged with the first pin-insertion hole 11 is designed corresponding to the configuration of the first pin-insertion hole 11 to have a thickness in the shutter sliding direction which is greater than a thickness in a direction normal to the shutter sliding direction.

The reason why the first straight pin 56 has a lesser thickness in the normal direction than the thickness in the shutter sliding direction is that the disk cartridge 1 actually has no room for accommodating the first straight pin 56 having the increased thickness in the normal direction because the thickness of the disk cartridge 1 is strictly standardized.

The first straight pin 56 is engaged with the first pin-insertion hole 11 in a tight-fitting manner.

Then, the first straight pin 56 is formed at its distal end with a head by using an ultrasonic welding machine and provided as the first connecting pin 13.

Other structural parts are substantially same as those of the first embodiment and therefore repeated explanations thereof are omitted.

Since the disk cartridge of the second embodiment is so arranged that the first connecting pin 13 engaged with the first pin-insertion hole 11 acting as the reference hole for positioning, has the greater thickness in the shutter sliding direction and the lesser thickness in the direction normal to the shutter sliding direction, the first connecting pin 13 has an increased mechanical strength in the shutter sliding direction. Therefore, the first connecting pin 13 is prevented from being damaged even in a case where an excessive stress is applied thereto in the shutter sliding direction.

Figure 11:
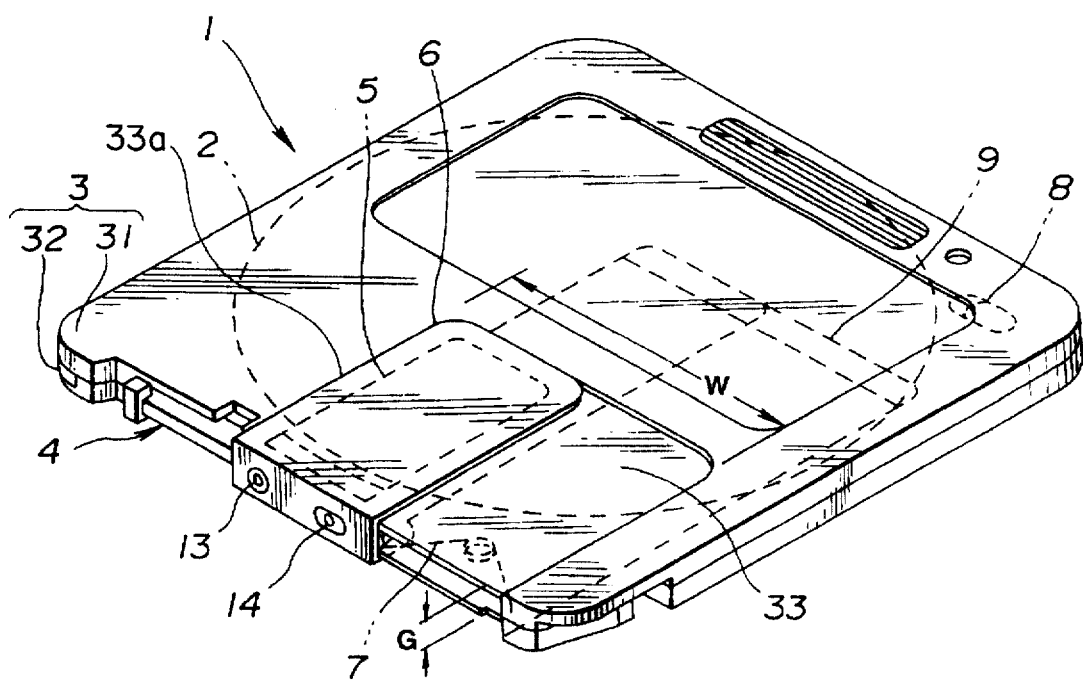
FIG. 11 is a perspective view of a disk cartridge of a third embodiment of the present invention.
Figure 12:
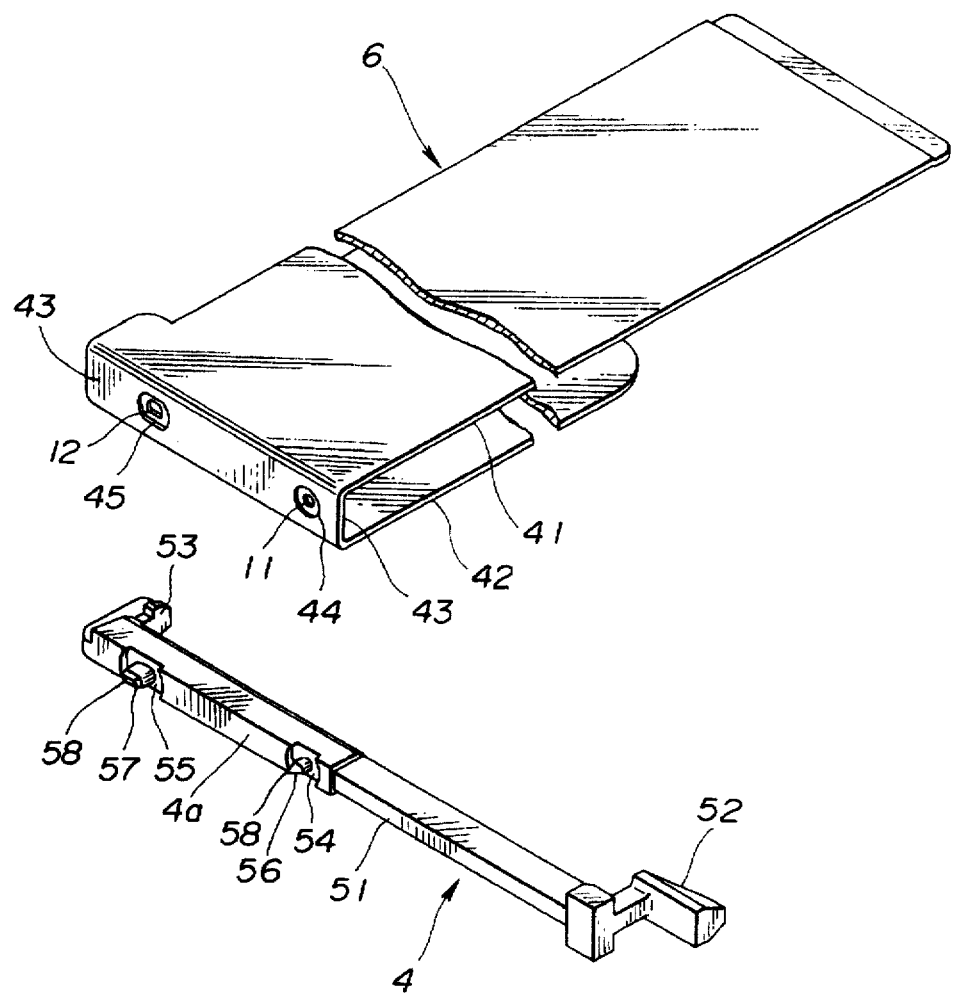
FIG. 12 is a perspective view showing a shutter and a slider.
Figure 13:
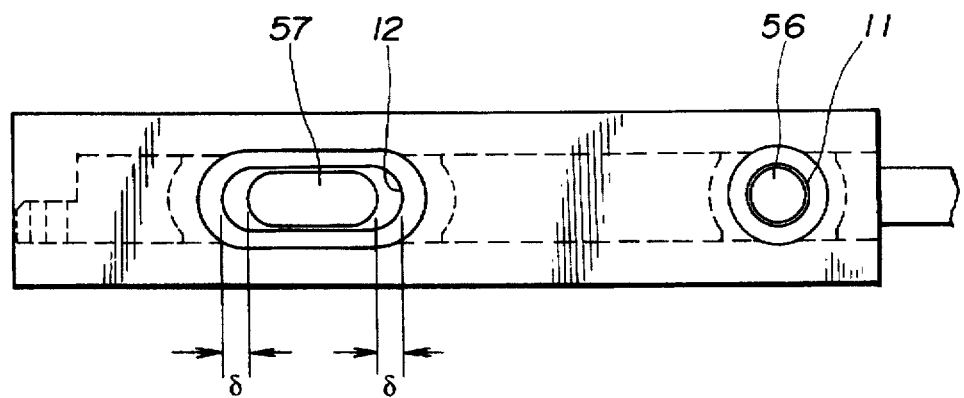
FIG. 13 is a plan view showing a condition in which a pin is inserted into a pin-insertion hole.

FIGS. 11–13 show a third embodiment of the present invention.

In this embodiment, the shutter 6 is so designed as to close the head or spindle insertion aperture 5 at a position near to the one side 33a of each shutter sliding area 33 of the shell body 4 in the shutter sliding direction.

The second connecting pin 14 which is placed at a farthest position away from the one side 33a of the shutter sliding area 33, is of a generally ellipsoidal shape having a thickness in the shutter sliding direction which is greater than a thickness in the direction normal to the shutter sliding direction.

As illustrated in FIG. 12, the second pin-insertion hole 12 is of a generally ellipsoidal shape elongated in the shutter sliding direction.

The second straight pin 57 acting as the second connecting pin 14 is of a generally ellipsoidal shape having a thickness in the shutter sliding direction which is greater than a thickness in the direction normal to the shutter sliding direction, similar to the second connecting pin 14.

The second straight pin 57 is loosely engaged with the second pin-insertion hole 12 with a predetermined clearance δ back and forth in the shutter sliding direction.

Further, the second straight pin 57 is formed at its distal end with a head by using an ultrasonic welding machine and provided as the second connecting pin 13.

Other structural parts are substantially same as those of the first embodiment and therefore repeated explanations thereof are omitted.

In the third embodiment, the second connecting pin 14 located at the farthest position away from the one side 33a of the shutter sliding area 33 has the greater thickness in the shutter sliding direction and the lesser thickness in the direction normal to the shutter sliding direction. This provides an increased mechanical strength in the shutter sliding direction. The increased mechanical strength in the shutter sliding direction is required for achieving the following purpose.

Figure 14:
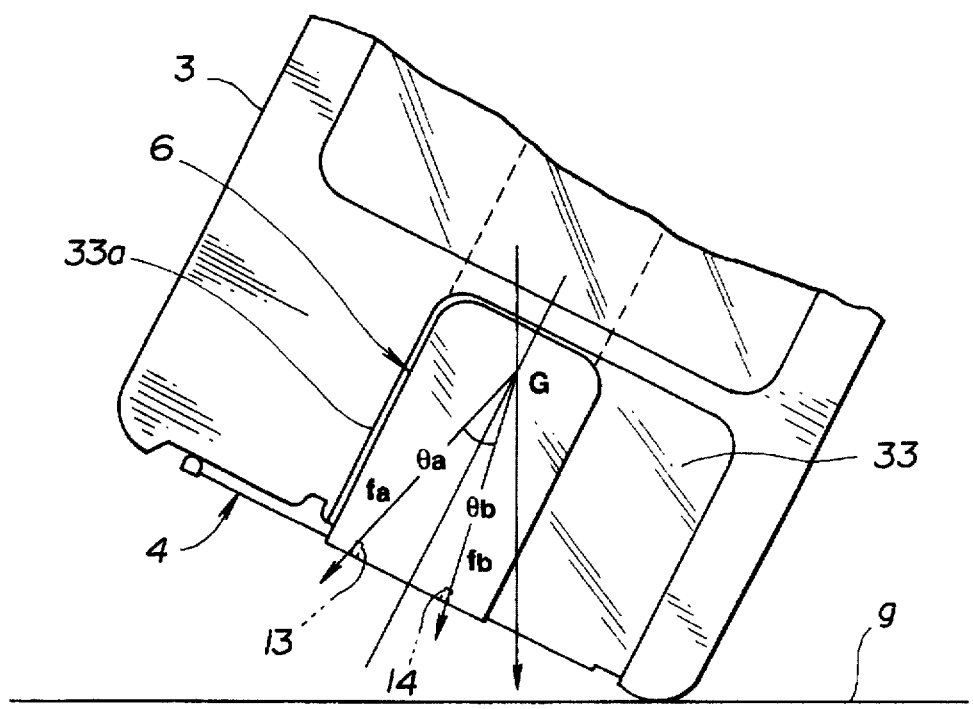
FIG. 14 is an explanatory diagram illustrating a force applied to the shutter in the event that the disk cartridge falls.

If the shutter 6 falls on the ground at a predetermined drop angle relative to the ground g as illustrated in FIG. 14, then the shutter 6 is exposed to an impact thereupon.

In this case, a force fa applied to the first connecting pin 13 and a force fb applied to the second connecting pin 14 are expressed by the following formulas:

$$fa \cdot \cos\theta a + fb \cdot \cos\theta b = W\cos\theta$$

$$fa \cdot \sin\theta a + W \cdot \sin\theta = fb \cdot \sin\theta b$$

where,

G denotes the center of gravity,

W denotes the weight of the shutter,

θa denotes an angle of the line between the first connecting pin 13 and G relative to vertical, and θb denotes an angle of the line between the second connecting pin 14 and G relative to vertical.

Namely, fa and fb are unequal and functions of the drop angle θ.

As a result, fb/fa is approximately 2.5, if the drop angle θ=45°. Accordingly, in the case of falling as mentioned above, an impact force applied to the second connecting pin 14 is approximately two and a half times greater than an impact force applied to the first connecting pin 13.

This is the reason the second connecting pin 14 is of a generally ellipsoidal shape to have a sectional area which is larger by approximately two and a half times than the first connecting pin 13, whereby the second connecting pin 14 is as resistant to the impact force applied upon falling, as the first connecting pin 13.

Figure 15:
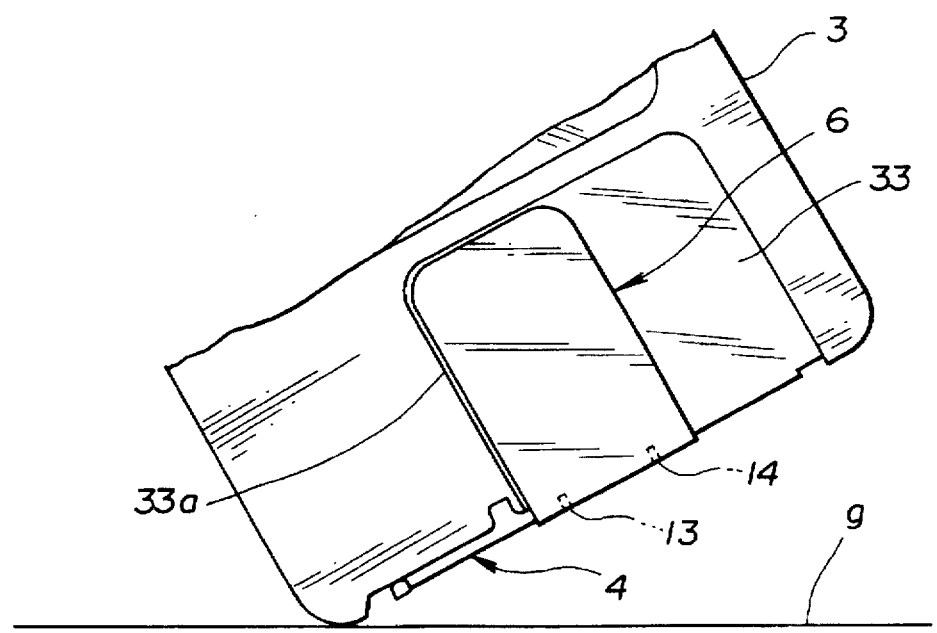
FIG. 15 is an explanatory diagram illustrating a force applied to the shutter in the event that the disk cartridge falls.

As illustrated in FIG. 15, in the case reverse to the aforementioned case, where the disk cartridge 1 falls at the drop angle θ=44° in such a manner that its corner located on an opposite side of the shutter 6 to the side thereof as indicated in the aforementioned case, is hit on the ground, the impact force applied to the first connecting pin 13 is greater than the impact force applied to the second connecting pin 14.

However, since the shutter 6 is contacted with the one side 33a of the shutter sliding area 33 of the shell body 3 to be supported on the one side 33a, the impact force applied to the first connecting pin 13 is reduced whereby the first connecting pin 13 is protected from the impact upon falling.

FIGS. 16–22 show a fourth embodiment of the present invention.

This embodiment is a combination of the second embodiment and the third embodiment, in which both the first connecting pin 13 and the second connecting pin 14 are of a generally ellipsoidal shape having an increased thickness in the shutter sliding direction.

The first pin-insertion hole 11 is of a generally ellipsoidal shape elongated in the shutter sliding direction.

Figure 16:
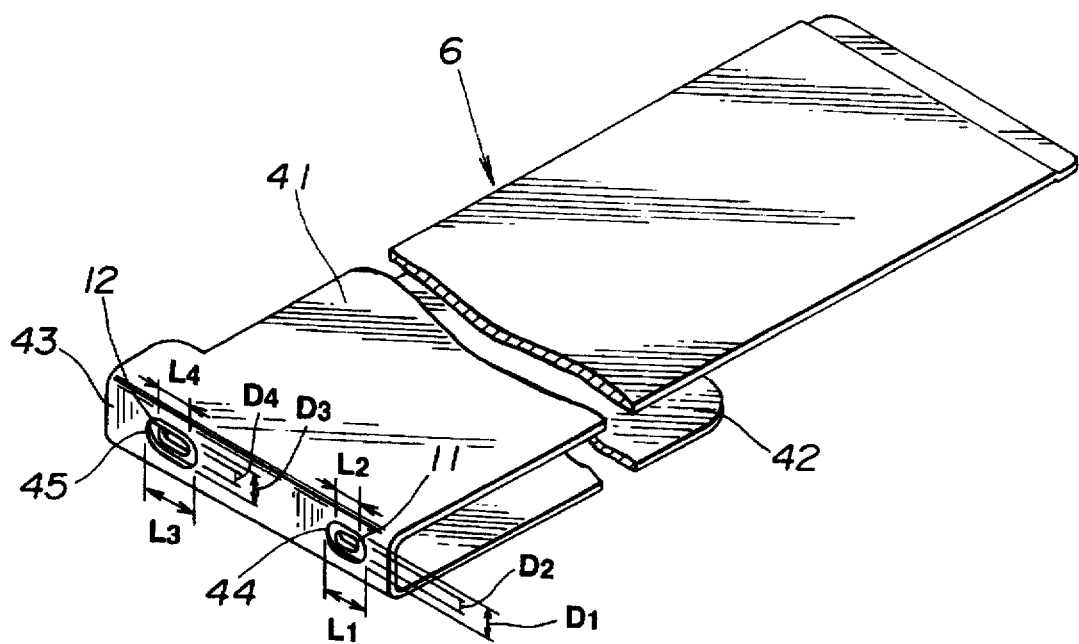
FIG. 16 is a perspective view showing a shutter and a slider of a fourth embodiment of the present invention.
Figure 16:
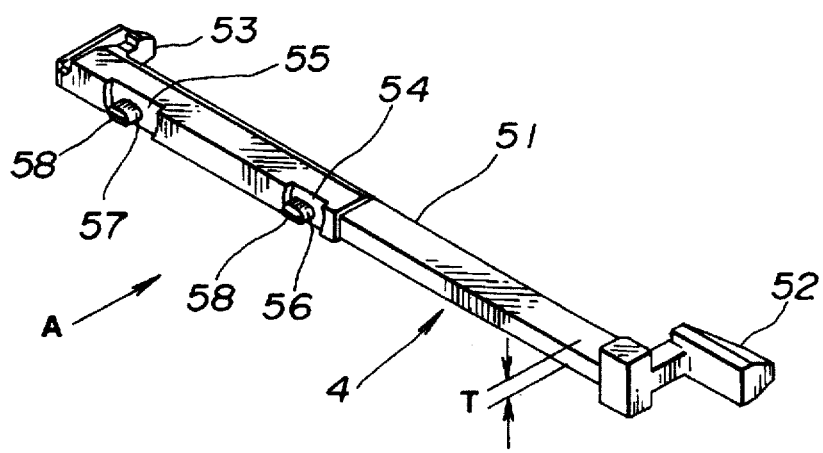

As illustrated in FIG. 16, the connecting section 43 of the shutter 6 is formed with a first recessed portion 44 at one end portion thereof in the shutter sliding direction (longitudinal direction), and with a second recessed portion 45 at the other end portion thereof in the same direction.

The first recessed portion 44 has the first pin-insertion hole 11 on its bottom and the second recessed portion 45 has the second pin-insertion hole 12 on its bottom.

The first and second recessed portions 44 and 45 are formed upon shaping the opposite end portions of the connecting section 43 by drawing.

The first recessed portion 44 is of a generally ellipsoidal shape which is elongated in the shutter sliding direction so as to have a length L1 and a width D1.

The first pin-insertion hole 11 is provided at the center of the bottom of the first recessed portion 44 and has a generally ellipsoidal shape which is elongated in the shutter sliding direction so as to have a length L2 and a width D2.

The second recessed portion 45 is of a generally ellipsoidal shape which is elongated in the shutter sliding direction so as to have a longer length L3 than the length L1 of the first recessed portion 44 and a width D3 equal to the width D1 of the first recessed portion 44.

The second pin-insertion hole 12 is provided at the center of the bottom of the second recessed portion 45 and has a generally ellipsoidal shape which is elongated in the shutter sliding direction so as to have a longer length L4 than the length L2 of the first pin-insertion hole 11 and a width D4 equal to the width D2 of the first pin-insertion hole 11.

The mating surface 4a of the body portion 51 of the slider 4, which mates with the shutter 6, has at one end portion thereof a first concaved portion 54 engaged with the first recessed portion 44 of the shutter 6, and at the other end portion thereof a second concaved portion 55 engaged with the second recessed portion 45 of the shutter 6.

A first straight pin 56 extends uprightly from the center of a bottom of the first concaved portion 54 and acts as the first connecting pin 13 after the head 13a is formed thereon.

A second straight pin 57 extends uprightly from the center of a bottom of the second concaved portion 55 and acts as the second connecting pin 14 after the head 14a is formed thereon.

The first straight pin 56 and the second straight pin 57 have a generally ellipsoidal shape as viewed from the distal end side (in a direction as indicated by arrow A), which is elongated in the shutter sliding direction as similar to the first pin-insertion hole 11.

The first straight pin 56 and the second straight pin 57 have mountain-shaped tip ends having edges 58 extending in the shutter sliding direction. The first straight pin 56 has a predetermined height (length).

The second straight pin 57 is so designed as to be higher (longer) than the first straight pin 56.

Figure 17:
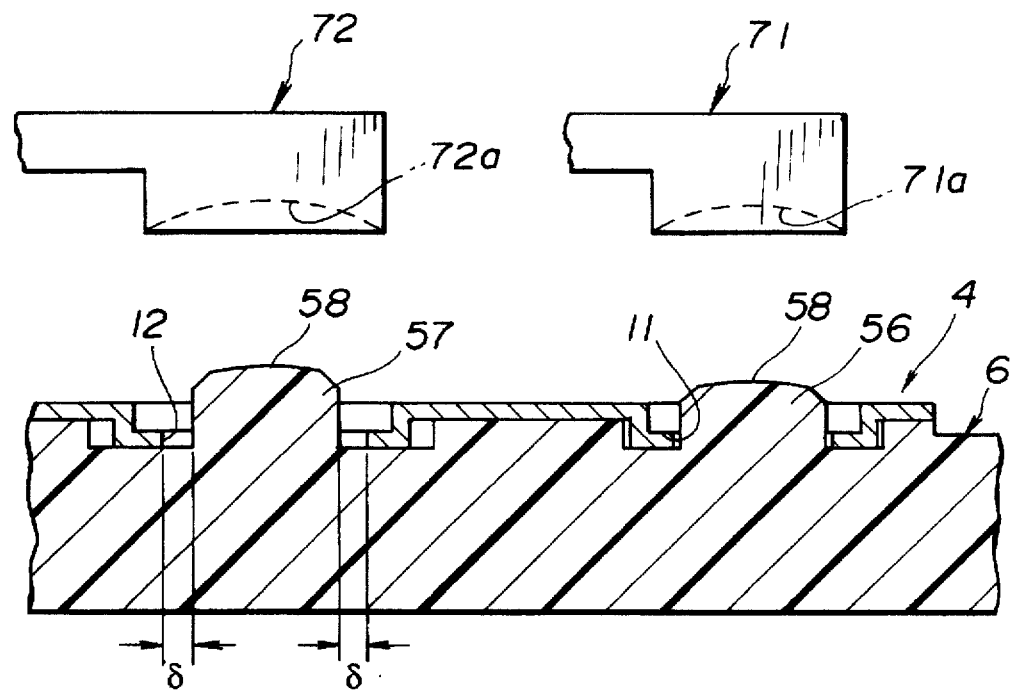
FIG. 17 is a view showing a step in which the shutter is coupled with the slider.

When the first straight pin 56 and the second straight pin 57 are inserted into the first pin-insertion hole 11 and the second pin-insertion hole 12, respectively, the first straight pin 56 is engaged with the first pin-insertion hole 11 in tight-fitting relation to an inner circumferential surface of the first pin-insertion hole 11, as shown in FIG. 17.

On the other hand, the second straight pin 57 is received at the center of the second pin-insertion hole 12 with a predetermined clearance δ back and forth in the shutter sliding direction.

Owing to the fitting engagement of the first straight pin 56 with the first pin-insertion hole 11 as described above, the relative positioning of the shutter 6 and the slider 4 is performed. Simultaneously, the provision of the clearance δ between the second straight pin 57 and the second pin-insertion hole 12 serves for compensating dimensional errors occurring inevitably upon the formation of the first and second straight pins 56 and 57 and the pin-insertion holes 11 and 12.

Then, subsequent to inserting the first straight pin 56 and the second straight pin 57 into the first pin-insertion hole 11 and the second pin-insertion hole 12, respectively, as described above, the heads 13a and 14a are formed at the distal ends of the first and second straight pins 56 and 57, respectively.

Figure 18:
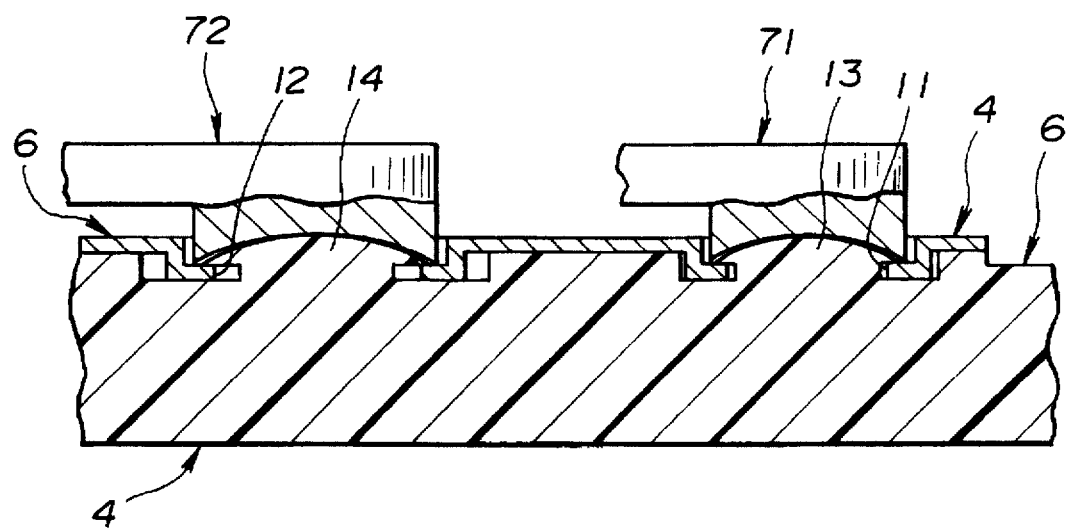
FIG. 18 is a view showing a step in which the shutter is coupled with the slider.

As shown in FIGS. 17 and 18, the formation of the heads 13a and 14a is performed by using an ultrasonic welding machine in such a manner that first and second horns 71 and 72 of the ultrasonic welding machine are contacted with the distal ends of the first and second straight pins 56 and 57 to apply vibrations thereto.

The first horn 71 is provided for forming the head 13a at the distal end of the first straight pin 56 and has its lower surface acting as an arcuate head-forming face 71a which is so designed as to have same configuration and size as the head 13a.

First, the first horn 71 moves downward until the arcuate head-forming face 71a contacts the edge 58 of the distal end of the first straight pin 56.

Figure 19:
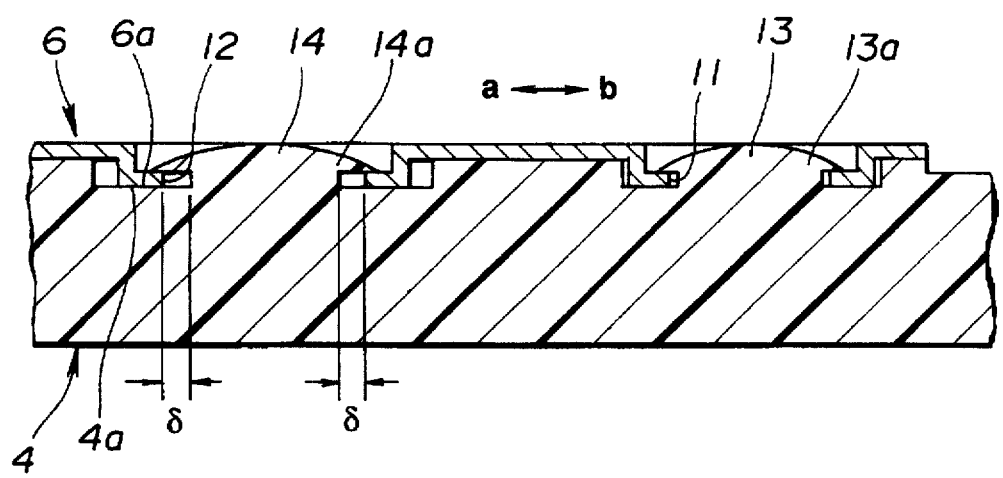
FIG. 19 is a sectional view of an essential portion of the disk cartridge.
Figure 20:
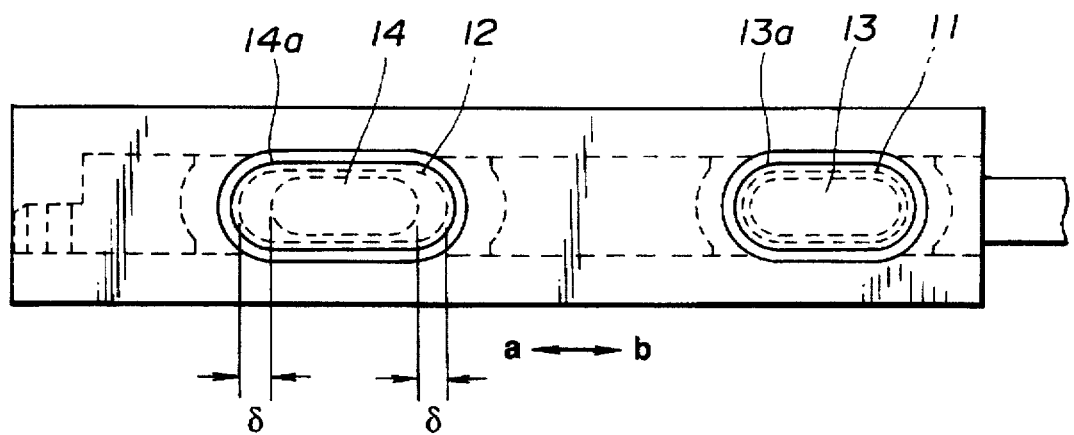
FIG. 20 is a plan view of an essential portion of the disk cartridge.

Then, when the first horn 71 is caused to vibrate, the edge 58 of the first straight pin 56 is heated and plastic-deformed to be shaped into a curved surface along the arcuate head-forming face 71a. As a result, as illustrated in FIGS. 19 and 20, the head 13a is provided at the distal end of the first straight pin 56 in the first concaved portion 54 so that the first straight pin 56 forms the first connecting pin 13 having the head 13a at the distal end.

The second horn 72 is provided for forming the head 14a at the distal end of the second straight pin 57 and has its lower surface acting as an arcuate head-forming face 72a which is so designed as to have same configuration and size as the head 14a. First, the second horn 72 moves downward until the arcuate head-forming face 72a contacts the edge 58 of the distal end of the second straight pin 57. Then, when the second horn 72 is caused to vibrate, the edge 58 of the second straight pin 57 is heated and plastic-deformed to be shaped into a curved surface along the arcuate head-forming face 72a. As a result, as illustrated in FIGS. 19 and 20, the head 14a is provided at the distal end of the second straight pin 57 in the second concaved portion 55 so that the second straight pin 57 forms the second connecting pin 14 having the head 14a at the distal end.

Figure 21:
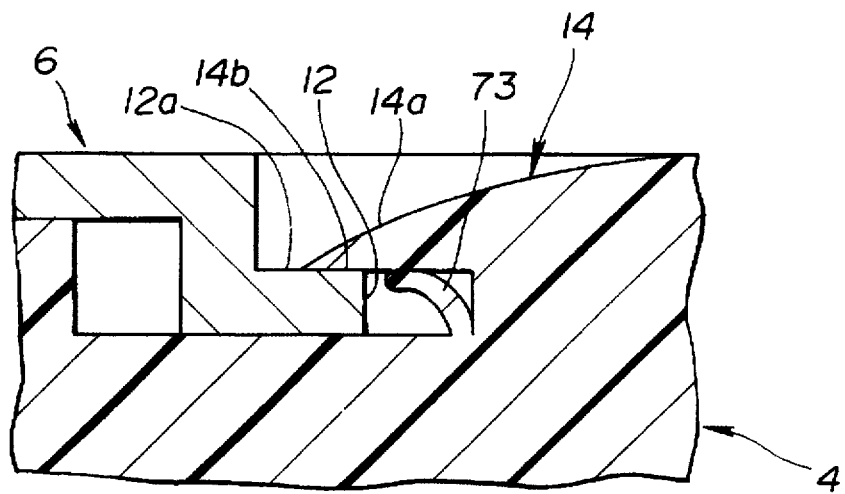
FIG. 21 is an enlarged sectional view of a portion of a second connecting pin.

When the head 14a is formed by applying vibration to the distal end of the second straight pin 57 through the second horn 72, a shearing flash 73 (projection) as shown in FIG. 21, is produced in the clearance δ formed at a portion of the slider 4 at which the second straight pin 57 is uprightly provided.

Although it is likely that the shearing flash 73 projecting outwardly from the clearance δ gives a poor appearance of the shutter 6, the head 14a of the second connecting pin 14 is contacted at a lower face 14b extending along its circumferential edge with an upper face 12a extending along a full circumference of the second pin-insertion hole 12 of the shutter 4 so that the shearing flash 73 is received in the second pin-insertion hole 12 and therefore prevented from exposure to the outside.

The disk cartridge of the fourth embodiment has the construction as described above in which the first connecting pin 13 and the second connecting pin 14 have the increased thickness in the shutter sliding direction to thereby provide an enhanced mechanical strength in that direction.

Figure 22:
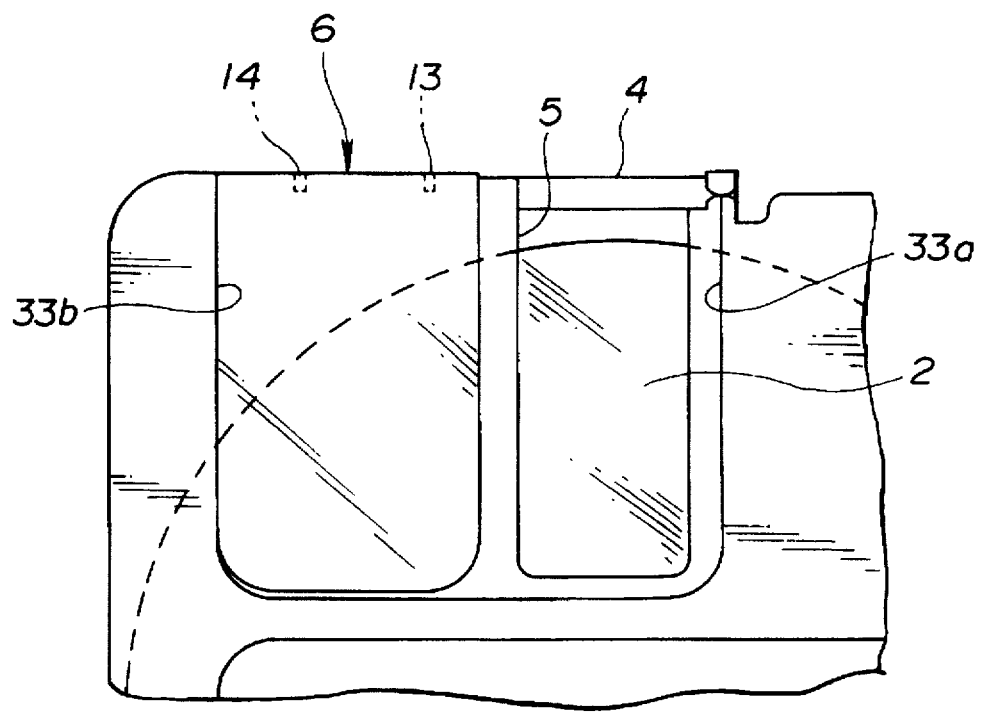
FIG. 22 is a front elevation showing a condition in which an aperture of a shell body is open.

Accordingly, the first connecting pin 13 can be avoided from being broken even if a strong force in a shearing direction is applied to the first connecting pin 13 by pressing the slider 4 when the shutter 6 is placed in a position as illustrated in FIG. 22, namely in the case where the shutter 6 opens the head or spindle insertion aperture 5 and is prevented from its further sliding movement from the position.

Similarly, even in the event that a strong force is applied to the second connecting pin 14 in the axial direction upon falling of the disk cartridge, the second connecting pin 14 can be prevented from being broken.

In this embodiment, since the head 14a of the second straight pin 57 is larger than the head 13a of the first straight pin 56, a great amount of synthetic resin is required for manufacturing the head 14a. This is the reason why the second straight pin 57 is designed to be higher than the first straight pin 56.

Figure 23:
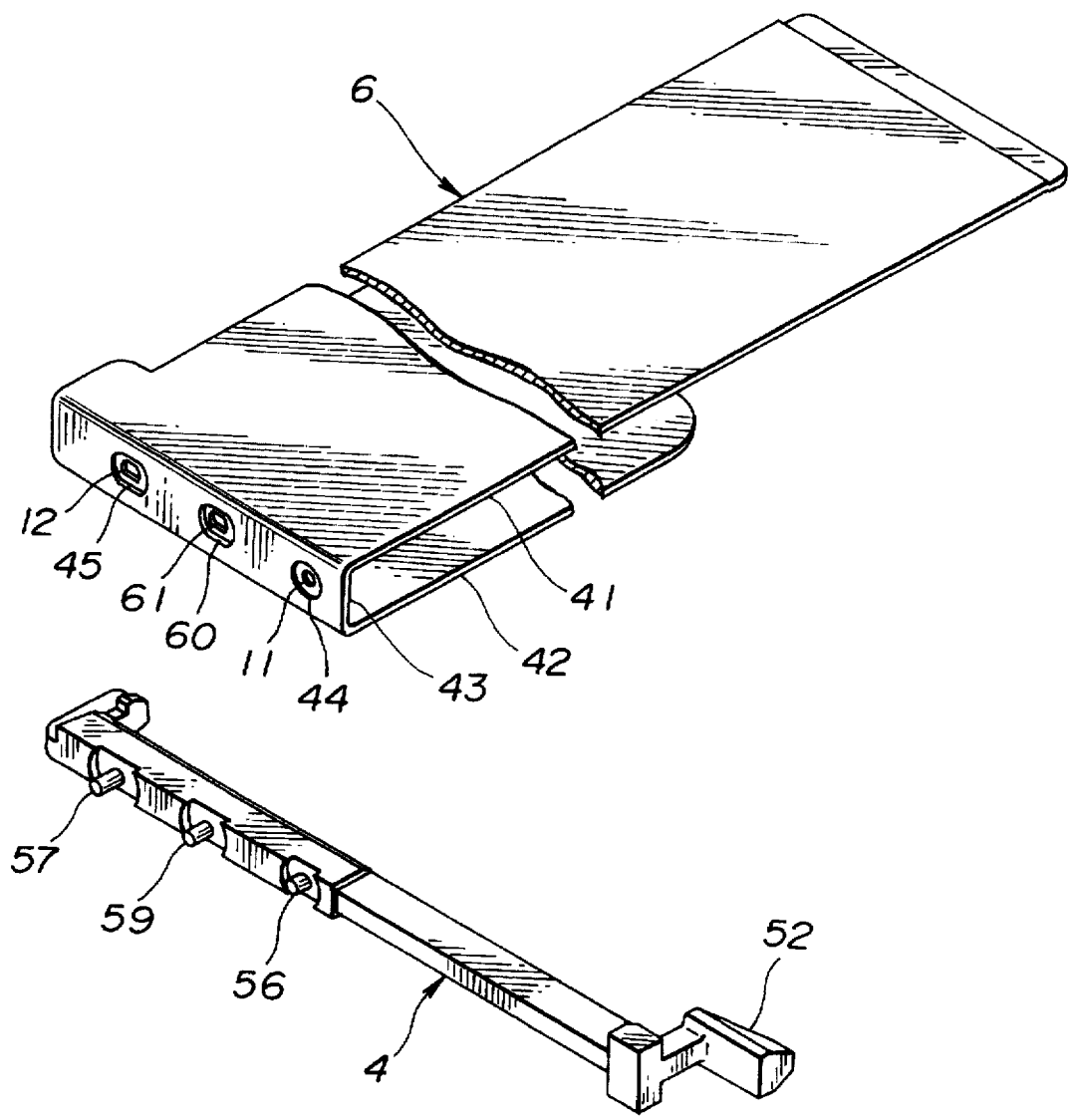
FIG. 23 is a perspective view showing a shutter and a slider of a fifth embodiment of the present invention.

FIG. 23 shows a fifth embodiment of the present invention.

This embodiment provides an arrangement having improved coupling strength between the slider 4 and the shutter 6 by providing the slider 4 with first, second, and third straight pins 56, 57, and 59, providing the shutter 6 with first, second, and third recessed portions 44, 45 and 60, and forming first, second, and third pin-insertion holes 11, 12, and 61 on bottoms of these first, second, and third recessed portions 44, 45 and 60.

The second and third straight pins 57 and 59 are so designed as to be slightly higher (longer) than the first straight pin 56.

The first pin-insertion hole 11 is of a circular shape and the second and third pin-insertion holes 12 and 61 are of an elongated circular shape.

The first, second, and third straight pins 56, 57, and 59 are inserted into the first, second, and third pin-insertion holes 11, 12, and 61 and the first, second, and third recessed portions 44, 45, and 60, respectively. Then, the first, second, and third straight pins 56, 57, and 59 are plastic-deformed in the first, second, and third recessed portions 44, 45, and 60 by using an ultrasonic welding machine to be formed at their distal ends with larger-diameter heads for firmly coupling the slider 4 and the shutter 6. Other structural parts are similar to the first embodiment, and therefore repeated explanations thereof are omitted.

Figure 24:
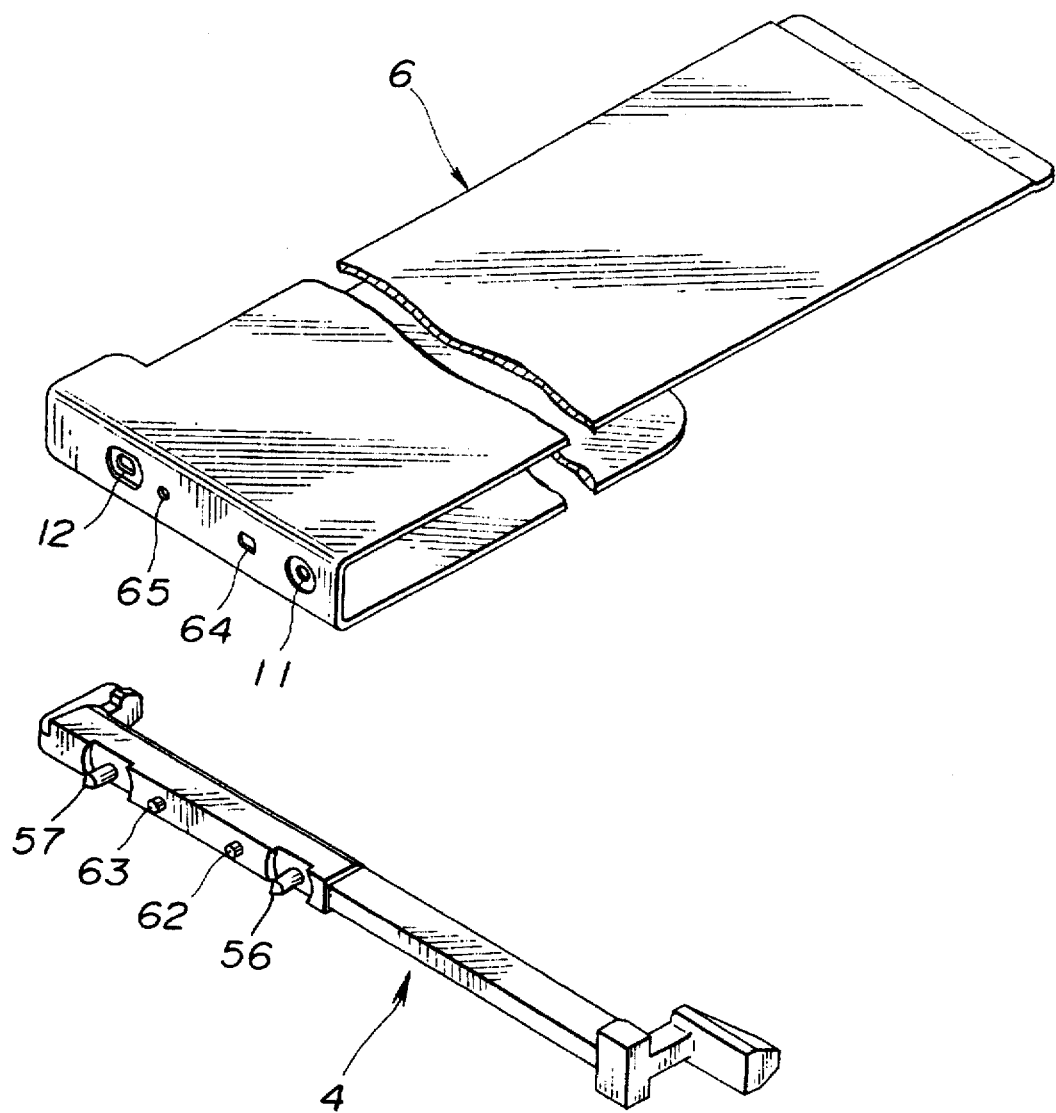
FIG. 24 is a perspective view showing a shutter and a slider of a sixth embodiment of the present invention.
Figure 25:
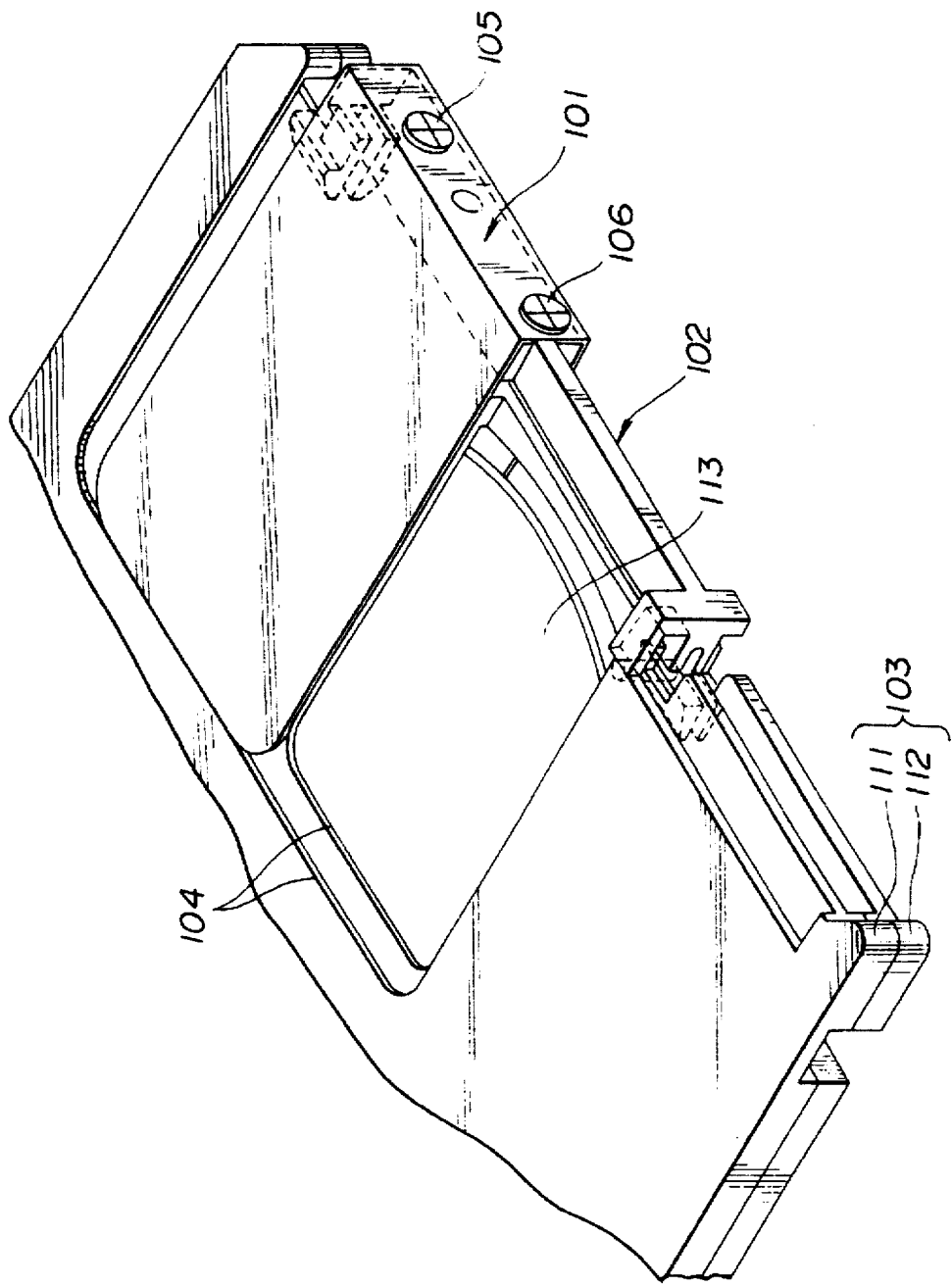
FIG. 25 is a perspective view of a conventional disk cartridge.

FIG. 24 shows a sixth embodiment of the present invention.

This embodiment provides an arrangement in which a firm coupling of the slider 4 and the shutter 6 is performed by providing first and second straight pins 56 and 57 and first and second positioning pins 62 and 63 on the slider 4, inserting the first and second positioning pins 62 and 63 into positioning-pin-insertion holes 64 and 65 formed on the shutter 6 to perform the positioning of the slider 4 relative to the shutter 6, and plastic-deforming the distal ends of the first and second straight pins 56 and 57 by using an ultrasonic welding machine to provide the heads.

In this embodiment, since there is provided the engagement of the positioning pins 62 and 63 with the positioning-pin-insertion holes 64 and 65, it is not required to use either one of the first and second straight pins 56 and 57 for positioning as explained in the first through the fifth embodiments.

In the above embodiments, although the first connecting pin 13 or the second connecting pin 14 are of a generally ellipsoidal shape, their configuration is not limited to the ellipsoidal shape but may be an elongated rectangular shape or other shapes. It is essential only that the configuration is approximately of an ellipsoidal shape and so designed as to provide an increased mechanical strength in a sliding direction of the shutter.

In addition, the number of the connecting pins and the number of the pin-insertion holes are not limited to two and may be more than three.

We claim:

1. A disk cartridge comprising:
   a shell body containing a disk-shaped recording medium adapted for rotation therein;
   a slider having a mating surface slidably disposed along an end of said shell body, said slider being made of synthetic resin;
   a plurality of connecting pins having proximal ends attached to said mating surface of said slider; and
   a shutter having a plurality of pin-insertion holes formed therethrough, said shutter being secured to said slider by said plurality of connecting pins, and said shutter opening or closing a head or spindle insertion aperture formed in said shell body in association with a sliding movement of said slider,
   wherein said plurality of connecting pins securing said shutter to said slider are inserted into said pin-insertion holes and permanently or plastically deformed at distal ends thereof to provide securing heads at said distal ends of said plurality of connecting pins, said securing heads having a greater diameter than a diameter of said pin-insertion holes so that said shutter is interposed between said securing heads and said mating surface of said slider, whereby said shutter and said slider are coupled together.

2. A disk cartridge as set forth in claim 1, wherein at least one of said plurality of connecting pins has a generally ellipsoidal shape with a major axis along a sliding direction of said shutter.

3. A disk cartridge as set forth in claim 2, wherein one of said plurality of connecting pins is engaged with an inner circumferential surface of one of said plurality of pin-insertion holes of said shutter in a tight-fitting relation, and others of said plurality of connecting pins are loosely engaged with inner circumferential surfaces of respective others of said plurality of pin-insertion holes to provide a predetermined clearance therebetween.

4. A disk cartridge as set forth in claim 1, wherein at least one of said plurality of pin-insertion holes of said shutter has a generally ellipsoidal shape with a major axis along a sliding direction of said shutter.

5. A disk cartridge as set forth in claim 1, wherein said securing heads are formed at said distal ends of said plurality of connecting pins by ultrasonic welding to permanently or plastically deform said distal ends.

6. A disk cartridge as set forth in claim 1, wherein
   said shell body has a recessed shutter sliding area with a side wall for restricting said sliding movement of said shutter,
   said shutter is constructed to be slidably disposed in said shutter sliding area to close said head or spindle insertion aperture when said shutter is near said side wall of said shutter sliding area, and
   one of said plurality of connecting pins coupling said shutter with said slider that is disposed at a farthest position apart from said side wall of said shutter sliding area has a generally ellipsoidal shape with a major axis along a shutter sliding direction.

7. A disk cartridge as set forth in claim 1, wherein said plurality of connecting pins have a generally ellipsoidal shape with a major axis along the shutter sliding direction.

8. A method of manufacturing a disk cartridge including a slider slidably disposed along an end of a shell body containing a disk-shaped recording medium adapted for rotation therein, said slider being made of synthetic resin, and a shutter for opening or closing an aperture for insertion of a head for accessing said disk-shaped recording medium contained in said shell body or a spindle for rotatingly driving said disk-shaped recording medium, said shutter being connected with said slider, said method comprising the steps of:
   forming a plurality of pin-insertion holes on a mating surface of said shutter;
   forming a plurality of connecting pins on a mating surface of said slider, wherein proximal ends of said plurality of connecting pins are attached to said mating surface of said slider, said mating surface of said slider mating with said mating surface of said shutter;
   inserting said plurality of connecting pins into said plurality of pin-insertion holes; and
   connecting said shutter to said slider by permanently or plastically deforming distal ends of said plurality of connecting pins to form securing heads at said distal ends of said plurality of connecting pins, said securing heads having a larger diameter than a diameter of said plurality of pin-insertion holes so that said shutter is supported between said securing heads and said mating surface of said slider.

9. A method as set forth in claim 8, wherein said securing heads are formed by permanently or plastically deforming said distal ends of said plurality of connection pins by ultrasonic welding.

10. A method as set forth in claim 8, wherein at least one of said plurality of connecting pins has a generally ellipsoidal shape with a major axis along a sliding direction of said shutter.

11. A method as set forth in claim 8, wherein one of said plurality of connecting pins is in tight contact with an inner circumferential surface of one of said plurality of pin-insertion holes of said shutter, and others of said plurality of connecting pins are loosely received in respective others of said plurality of pin-insertion holes of said shutter such that a predetermined clearance is formed between inner circumferential surfaces of said others of said plurality of pin-insertion holes and said others of said plurality of connecting pins.

12. A method as set forth in claim 8, wherein at least one of said plurality of pin-insertion holes has a generally ellipsoidal shape with a major axis along a sliding direction of said shutter.

* * * * *